March 8, 1938. D. TEATINI 2,110,778
CENTRIFUGAL SEPARATOR
Filed July 7, 1936 6 Sheets-Sheet 2

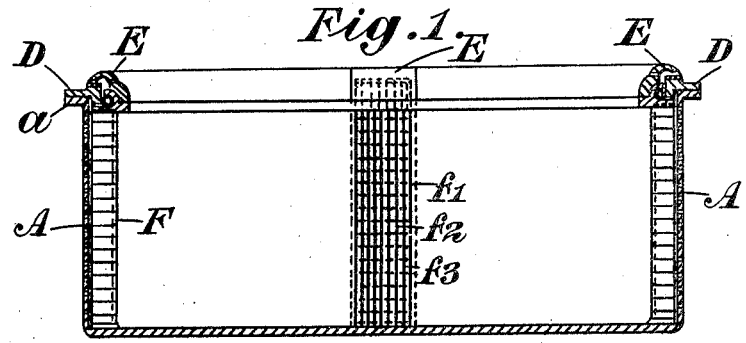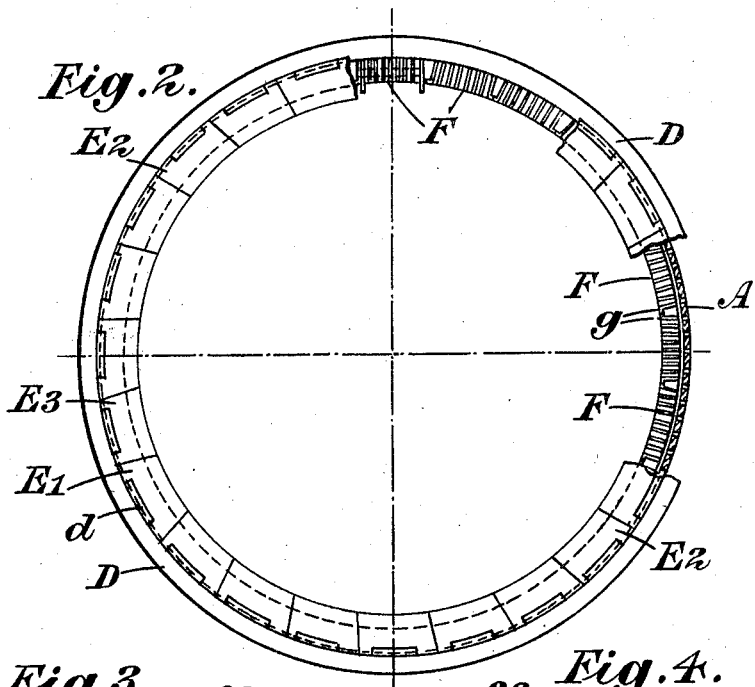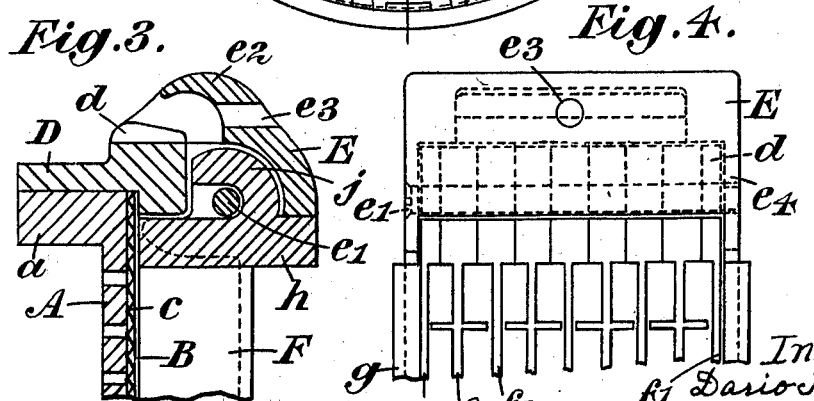

Inventor:
Dario Teatini
By Stebbins, Blenko & Parmelee, Attys

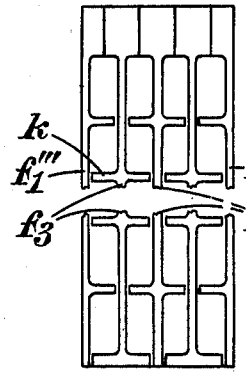
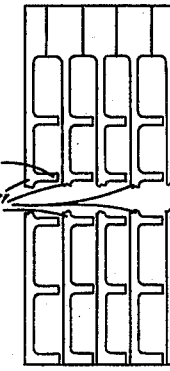
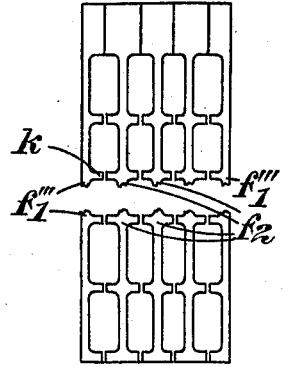
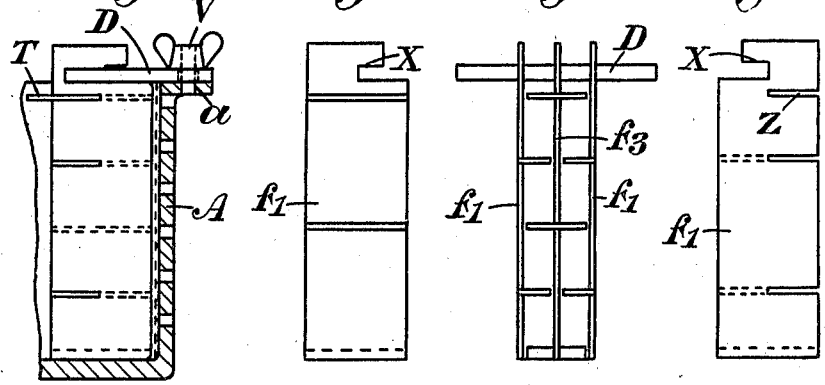
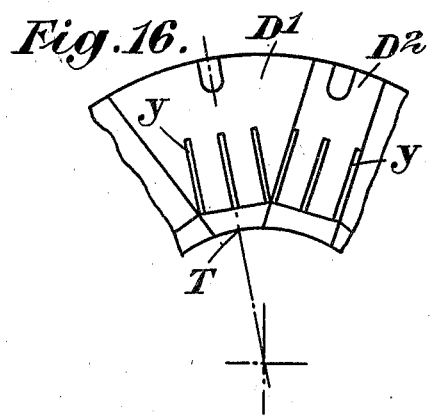
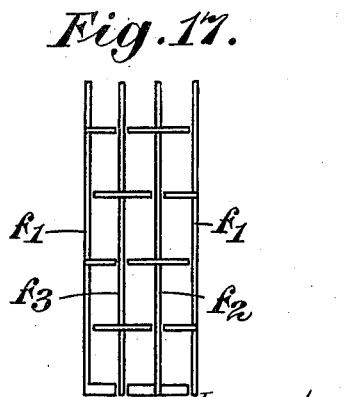

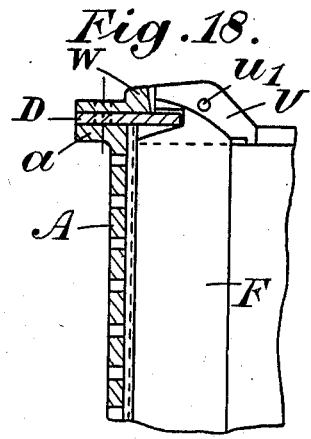
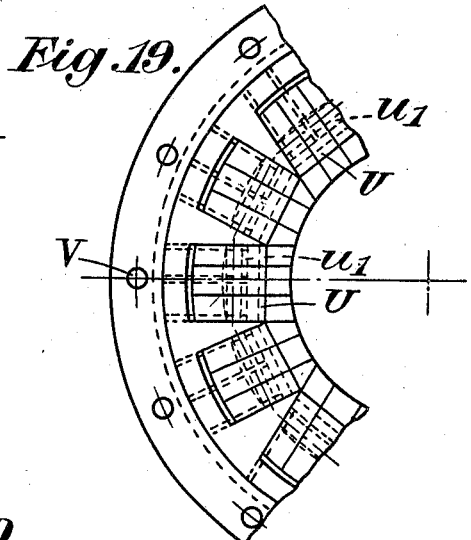
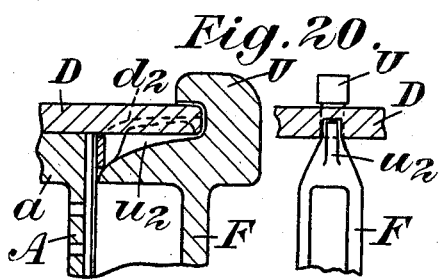
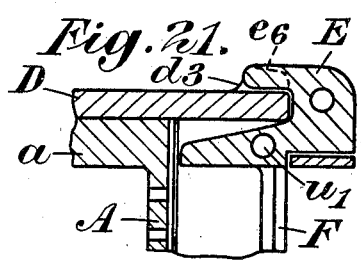
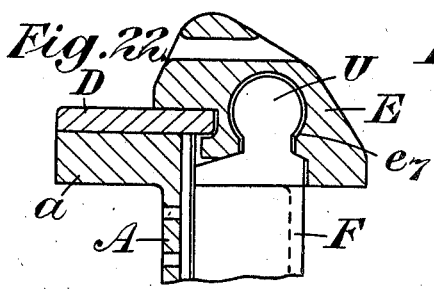
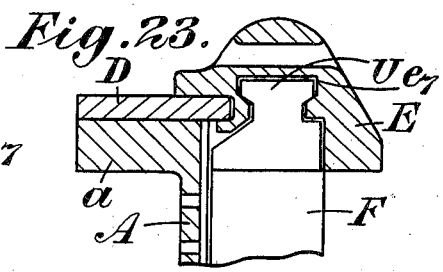
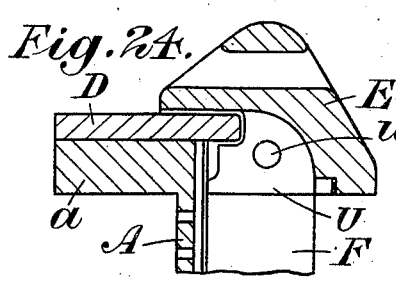
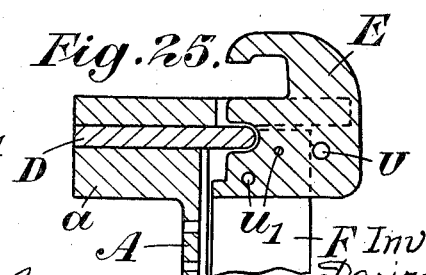

March 8, 1938. D. TEATINI 2,110,778
CENTRIFUGAL SEPARATOR
Filed July 7, 1936 6 Sheets-Sheet 5
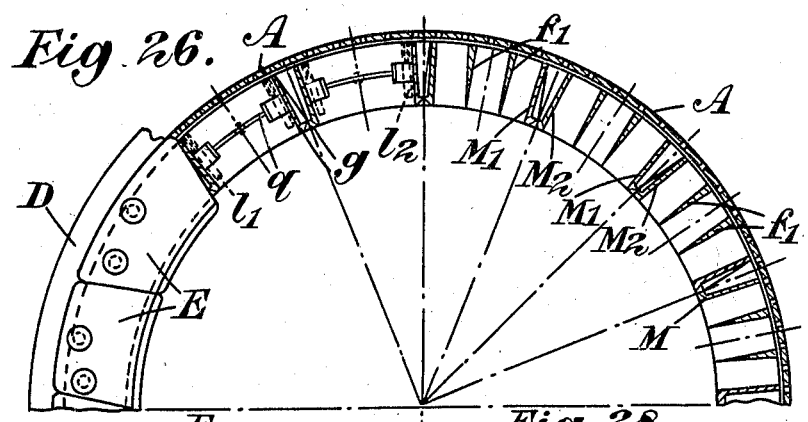
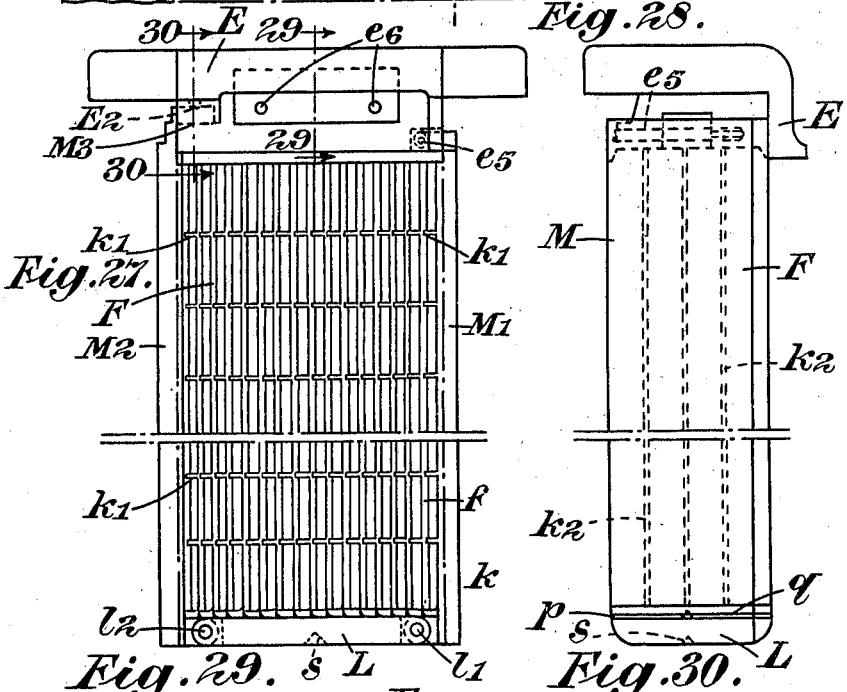
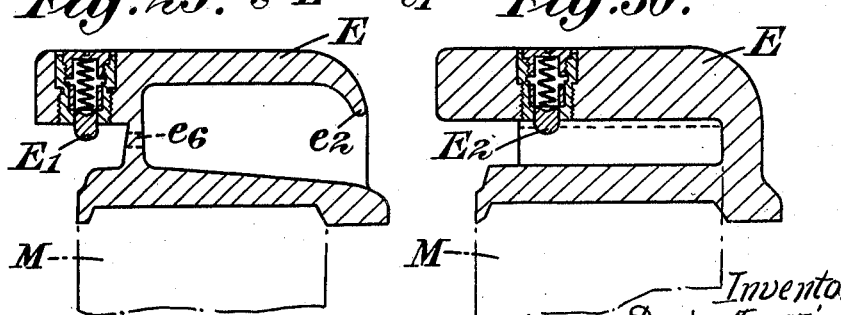

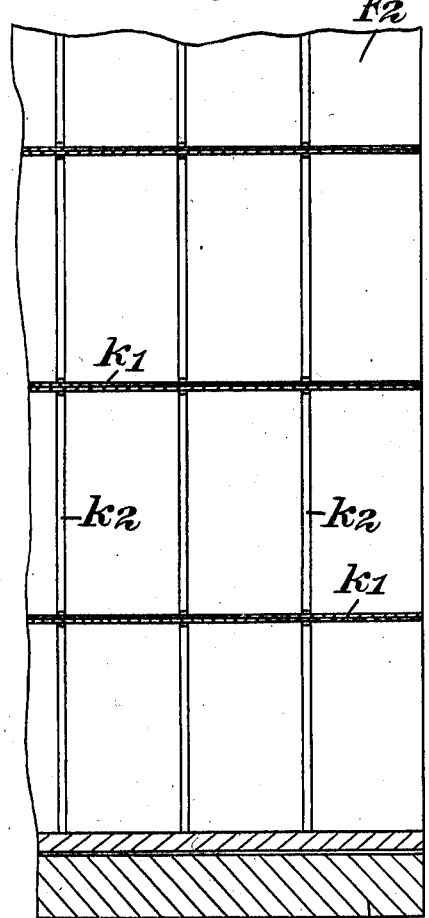
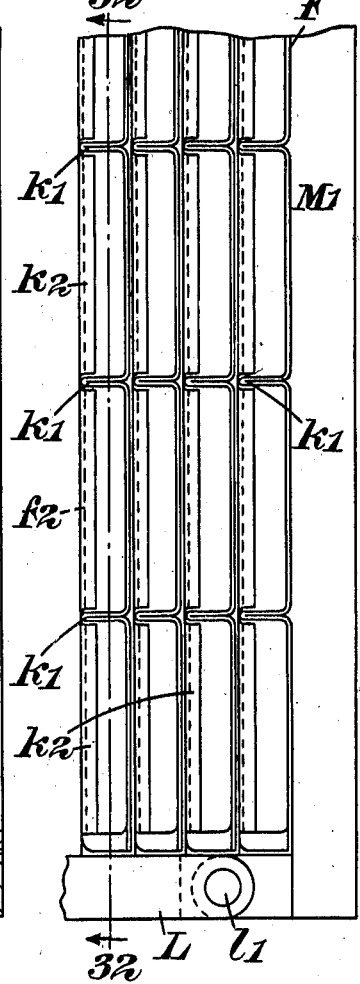
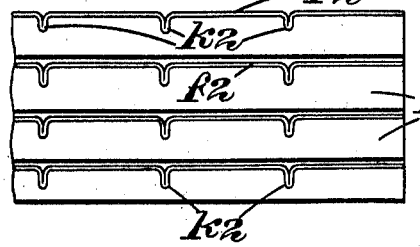
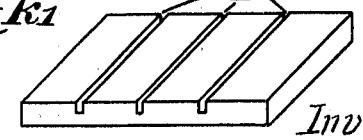

Patented Mar. 8, 1938

2,110,778

UNITED STATES PATENT OFFICE 2,110,778

CENTRIFUGAL SEPARATOR

Dario Teatini, Hougaerde, Belgium

Application July 7, 1936, Serial No. 89,401
In Belgium July 15, 1935

11 Claims. (Cl. 127—19)

This invention relates to centrifugal separators and to methods of producing blocks of solid material.

One object of the invention is to provide a method of producing blocks from a mixture of a solid and a liquid by simultaneously separating the liquid from the solid and depositing the solid in moulds by centrifugal action, then removing the blocks from the moulds. A supersaturated solution of the solid material may be forced through the solid deposited in the moulds by centrifugal action so that the solution partly crystallizes in the solid in the moulds and cements the block together. To facilitate removal of the blocks from the moulds they are preferably constituted by the spaces between flexible ribbed partitions which may be separated from one another after the blocks have been formed and then bent so as to free the blocks.

Another object of this invention is to provide a centrifugal separator comprising a rotatable drum having a perforated wall and a plurality of moulds detachably mounted in the drum to cover its perforated wall so that solid material will be deposited by centrifugal action in the moulds while liquid material will pass through the moulds and the perforated wall of the drum and will be separated from the solid material.

A further object of this invention is to provide a simple and convenient construction of the moulds. The moulds are preferably made from flexible partitions formed with ribs which partitions when assembled together constitute a cellular structure the cells of which correspond to the size and shape of the desired blocks. The partitions are preferably flexible and may be secured directly to a crown on the drum or they may be secured to a cap which is secured to the crown of the drum.

Various other objects of the present invention will be apparent from the following description of several mechanisms embodying the invention, and the invention also comprises certain new and useful features of construction hereinafter described and claimed.

In the accompanying drawings,

Figure 1 is a diagrammatic section through the drum of a centrifugal separator in accordance with the invention, Figure 2 is a plan of the separator shown in Figure 1, certain parts being broken away to show the construction, Figure 3 is a detailed section showing a cap and a part of a partition suspended from the cap, Figure 4 is a view of the parts shown in Figure 3 as seen from the right, Figure 5 is a partial section through the drum of a modified construction of the separator, Figure 6 is a view of the parts shown in Figure 5 as seen from the right, Figure 7 is a plan view of the parts shown in Figure 5 as seen from above, Figure 8 is a section on the line 8—8 of Figure 5, Figures 9, 10, and 11 show various forms of partition members.

Figure 12 shows a modified construction of the partition members and drum.

Figures 13 and 14 show the partition members used in Figure 12,

Figure 15 is a view of the parts shown in Figure 12 as seen from the left.

Figure 16 is a plan of the parts shown in Figure 12.

Figure 17 shows a modification of the arrangement shown in Figures 12 to 16.

Figures 18 and 19 are a vertical section and a plan respectively of yet another modification of the centrifugal separator, while Figures 20 to 25 inclusive illustrate yet further constructions by which the partition members may be mounted in the drum, Figure 26 is a plan through another construction of separator, parts being broken away.

Figures 27 and 28 are front and side elevations respectively of a shaping unit employed in the separator shown in Figure 26.

Figure 5:
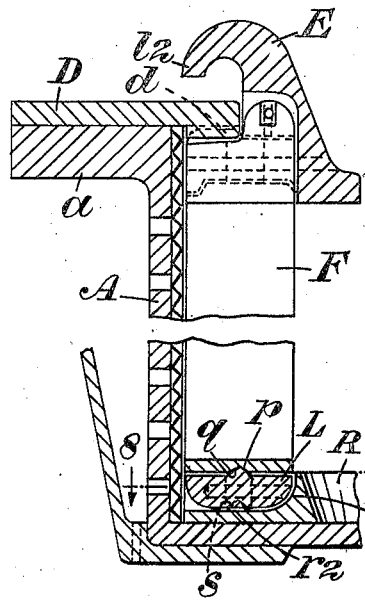

Figures 29 and 30 are sections on the lines 29—29 and 30—30 of Figure 27.

Figure 31 is an enlarged view of a part of Figure 27 and,

Figure 32 is a section on the line 32—32 of Figure 31,

Figure 33 is a plan of the parts shown in Figure 32, and

Figure 34 is a view of the block produced by the centrifugal separator.

Referring to Figures 1 to 4 the separator comprises a perforated rotary drum A inside which is mounted a sieve B by means of a perforated corrugated plate C or any other known support. The drum is provided with an external flange $a$ on which rests and to which is fixed a crown D. The latter, projects towards the interior of the drum A and partly fits in caps E, each supporting a mould unit F. These structures collectively entirely cover the internal periphery of the drum A and possess the partitions required for shaping the treated products, to the desired dimensions. These elements F may be of various constructions, and upon the latter will obviously depend the method of attachment to the caps E.

As shown more particularly in Figure 4, the unit F is constituted by partition plates f1, f2, f3. The plates f1 are external and form the frame of each element. Each of them possesses externally a flange g intended to fill the space between two adjacent elements F. The plates f1, f2, f3 possess in their upper portion a thickened part h and terminate in the form of a hook j for hooking to a pivot e1 passing through the cap E. The plates f1 and f2 are smooth, while the plates f3 are provided with ribs k defining with the adjacent walls the cells to be occupied by the blocks to be obtained.

In order to permit the juxtaposition of the various units F the commencing and closing caps E1 and E3 have profiles which are different from that of the succeeding caps E2 as shown in Figure 2. In their upper portion, the caps are shaped to form a handle e2 for facilitating the placing in position and removal of the elements. Each cap E has a hole e3 pierced in it for the insertion of a pin with the object of facilitating the dismounting of the first element. Between the flanges e4 of the cap E lies a registering lug d secured to the crown D.

The elements thus formed are of inexpensive construction, and their mounting and dismounting are easily effected, which is of considerable importance from the point of view of cleaning the elements.

According to a second form of construction shown in Figures 5 to 8, the external plates f1 of the elements F form with the cap E and a sole L a kind of frame in which the plates f2 and f3 are held and clamped. One of the external plates f'1 is hinged at one end to a pivot e5 of the cap E and at the other end to a pivot l1, of the sole L, while the other external plate f''1 is hinged to the pivot l2 of the sole L and is terminated in its upper part by a projection which carries a spring catch m or like device engaging the cap E.

The intermediate plates f2 and f3, the former smooth and the latter ribbed as previously, are fitted at their upper ends in a recess n provided in the cap E, while in their lower portions they are provided with a slot p embracing a rib q on the sole L, the said rib thus serving to guide and retain the intermediate plates in position. The registering lugs d (Figure 5) are formed on the underside of the crown D and fit into the cap E. A handle e2 likewise surmounts the cap E. The soles L of the elements F rest on an annular member R supported on the bottom of the drum. The internal part r1 of the member R is inclined and thus obliges the contents of the drum to rise into the compartments of the elements F. A registering projection r2 carried by the crown R enters a corresponding recess s in the sole L.

Figure 6:
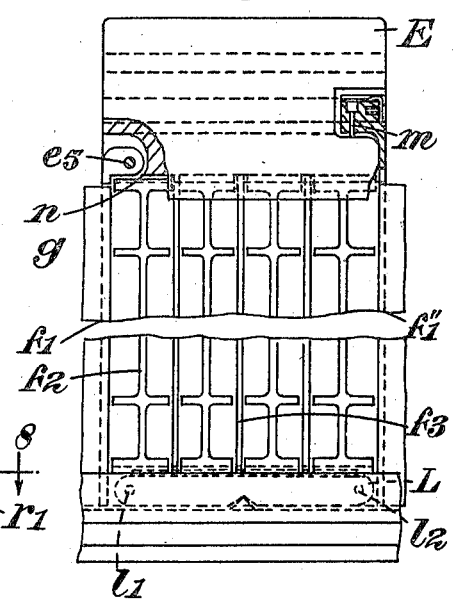
Figure 7:
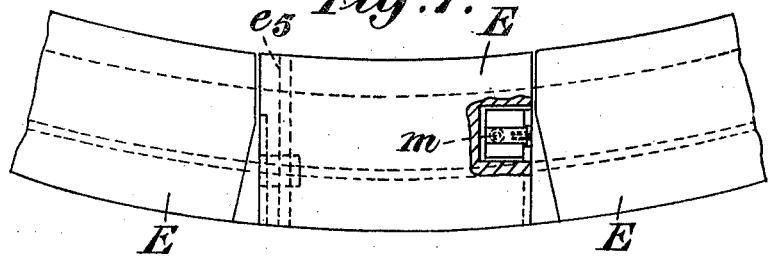
Figure 8:
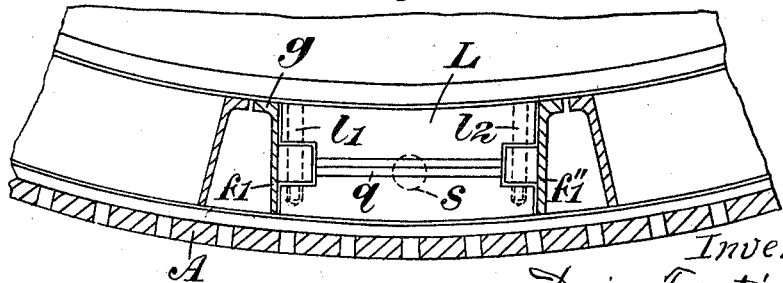

Instead of employing plates f1, f2, and f3 of the type shown in Figures 4 and 6, it is possible to select any one of the types shown in Figures 9 to 11. Thus, the external plates f1 may have ribs k which intercross with those of the plates f2 and f3. Or it is possible to employ only ribbed plates f1 closing the element by a ribless plate f1, as shown in Figure 10. Or again, it is possible to employ external plates f1, the reduced ribs of which join ribs provided on either side of intermediate plates f2.

Instead of being fixed or hooked to a cap, which itself is connected to the drum A, the plates may be fixed directly to the latter, that is to say to the crown D which is secured to the said drum. Figures 12 to 20 relate to plates of this kind. As shown in Figure 12, the crown D fixed by screws v to the flange a of the drum A projects into a recess x provided in each plate f1, f2, f3, and is formed itself of portions of alternatively trapezoidal shape D1 and rectangular shape D2 (Figure 16) so as to facilitate the mounting of the various elements F. In addition, the different portions of the crown D are pierced by slots y in each of which is inserted a plate f1, f2, f3, and the ribs k of the plates are completed by a plate T (Figures 12 and 16) entering into slots z (Figure 14) of the plates. The plates T project internally and are cut out either in a trapezoidal shape or in a rectangular shape so as to form a continuous surface. The plates f1, f2, f3 are smooth or ribbed as before, and the number thereof in each element may be increased from three to four as shown in Figure 17.

According to a constructional modification, the plates F (Figures 18 and 19) are surmounted by a special head U, the thickness of which gives the distance to be provided between the plates, the latter being connected together by a pin u1 passing through the said head. As before, the crown D projects into the recesses x of the plates and of their respective heads. Towards their inner (right-hand in Figure 18) ends, the said heads U have alternately a rectangular and trapezoidal shape so as to allow of a correct juxtaposition of the various elements, as shown by the partial plan view of Figure 19.

Figure 20 shows in section and in elevation another form of head U. The latter has a lug u2 projecting into a cavity d2 provided in the lower part of the crown D.

Figures 21 to 25 show various forms of cap. In the case of Figure 21, the plates forming the unit F are dowelled at u1 to the head E which has a recess e6 accommodating a lug d3 secured to the crown D. The cap U shown in Figure 22 is pierced by a cylindrical recess e7 into which are fitted the circular heads U surmounting the plates of the elements F. The said recess may have rectangular surfaces with re-entrant portions to which the boundary surfaces of the head U correspond, as in the case of Figure 23. In Figure 24, assembling is effected by the combination of a circular fitting of the head U in the corresponding cap E with fixing by the pin u1. Finally, in Figure 25 each plate F is connected at its top by rivets u to a thickened portion constituting a portion of the cap E. These various elements are held together by means of a pin u during their placing in position and removal.

As shown in Figures 26 to 33, the centrifugal separator comprises a perforated rotary drum A (Figure 26) within which is mounted an appropriate sieve by means of a support constituted, for example, by a perforated corrugated plate. Against the said sieve are applied, in contact with each other, cellular units F each comprising a cap E (Figures 27 and 28) a frame M and identical ribbed plates f, placed one against the other and clamped between the sides of the frame M. The cap E is provided with a handle e2 and has an external recess in which fits a crown D fixed to the upper part of the drum A and secured to the cap E by a spring catch E1 housed in the said cap. With a view to preventing, during the working of the separator, the vapours which penetrate the caps of the cellular elements from condensing on the said caps and descending into the separators and thus adversely affecting the colour of the product in the case of the application to the sugar industry, holes $e6$ have been pierced in the boundary wall of the handle $e2$, the said holes thus opening to the exterior of the basket A. The frame M is formed of lateral plates M1 and M2 mounted at their base on pivots $l1$ and $l2$ carried by a sole L. In its upper part, the plate M1 is mounted on a pivot $e5$ provided in each cap E, while the plate M2 is terminated by a projection M3 projecting into a recess in the cap E and held there by a second spring catch E2.

The sole L of each frame M rests, as described with reference to Figure 5, in the drum A on a base crown provided with registering projections which project into corresponding recesses $s$ in the said sole.

Inserted vertically in the frame M are partition plates $f$ clamped against the plates M1 and M2 and guided on their bases by a rib $q$ provided in the sole L of the frame projecting into notches $p$ in the plates. The said plates are provided, at predetermined intervals, with ribs $k$ formed, for example, by stamping from a thin plate made of a metal or alloy of metals possessing suitable resiliency. Under these conditions, in order to strip the blocks filling the cells bounded by successive plates and their ribs $k1$, it is merely necessary, after having separated the plates from their frame, to impart to them a sufficient outward curvature. Consequently, the ribs $k1$ move apart, releasing the crystallized blocks.

Longitudinal flanges $g$ are provided externally on the lateral plates M1 and M2 and close the joints between adjacent units. Furthermore, in order that a group of successive plates $f$ may occupy a rectangular space although the frame M is not rectangular, a smooth plate $f1$ is inserted between two groups of three or four ribbed plates, and as indicated in Figure 2, has a thickness which increases towards the exterior of the circumference of the cellular unit.

In a general manner, under the action of the centrifugal force, the solid-liquid mixture for example, a mixture of sugar and its mother liquor, introduced into the centrifugal is projected against the cellular elements F and the solid portion fills the cells constituted by the plates $f$, assuming the shape thereof, while the mother liquor is expelled through the perforations of the drum A. When the cells have become filled with material, the arrival of the mixture is stopped, and then washing is carried out by introducing an appropriate liquid into the centrifugal, this being followed by a liquid (for example a sugar solution when sugar is the solid) adapted to cement the individual crystals together. The solution is at such a temperature and degree of supersaturation that, on being forced through the solid material in the cells between the partitions, it partially crystallizes therein uniting the particles of material in a cell together to form a block. Finally, the blocks are dried by means of an intensive current of hot or cold air. The elements F are then dismounted, and the products are stripped from the moulds by curving the plates as described hereinbefore.

The dimensions of the products obtained obviously depend upon those of the plates $f$ and their ribs. It is thus possible to produce directly, in the sugar factory for example, pieces of sugar of normal size. It is likewise possible to produce blocks or cakes by increasing the width of the plates, and in particular, cakes having on one of the faces or both faces grooves $r$ of the desired depth, as indicated in Figure 34.

Figures 31, 32 and 33 of the accompanying drawings show especially an arrangement of the plates for producing cakes of this kind.

Each frame M contains a certain number of plates $f$ disposed one against the other, as clearly visible in Figure 32 with their transverse ribs $k1$. The said plates have a depth (Figure 28) equal to that to be given to the cake of Figure 34, and the distance between the ribs $k1$ will determine the height of the cake. In order to produce the grooves $r$, other plates $f2$ provided with longitudinal ribs $k2$ are placed against the unribbed faces of the plates $f$, as shown in Figures 31 to 33. The said longitudinal ribs $k2$ have a height corresponding to the depth to be given to the grooves $r$ in the cakes. In the present case, the longitudinal ribs $k2$ have been recessed slightly at the place where they meet the transverse ribs $k1$ for permitting the assembling of the plates. It is obvious that the converse arrangement could be employed. For stripping from the moulds, the plates $f2$ are withdrawn before imparting to the plates $f$ the curvature necessary for stripping off the blocks.

It is obvious that constructional modifications may be made in the devices described without departing from the scope of the invention and it is the intention therefore to be limited only as indicated by the scope of the following claims.

I claim:—

1. A centrifugal separator, comprising a vertically arranged open topped rotatable drum having a perforated side wall, a crown ring mounted on the rim of said drum, a plurality of removable moulding units of cellular structure covering said perforated wall, a plurality of caps detachably suspending said moulding units from said crown ring and detachably supporting said cellular structure of said moulding units and locating means on said crown ring and a spring catch housed in said caps cooperating to locate said caps on said crown ring.

2. A centrifugal separator, comprising a vertically arranged open topped rotatable drum having a perforated side wall, a crown ring mounted on the rim of said drum, a plurality of removable moulding units of cellular structure covering said perforated wall, a plurality of caps detachably suspending said moulding units from said crown ring, a pair of side partitions and a sole hingedly connected to each cap and surrounding and supporting said cellular structure of said moulding units and locating means on said crown ring and said caps cooperating to locate said caps on said crown ring.

3. A centrifugal separator, comprising a vertically arranged open topped rotatable drum having a perforated side wall, a crown ring mounted on the rim of said drum, a plurality of removable moulding units of cellular structure covering said perforated wall, a plurality of caps detachably suspending said moulding units from said crown ring, a pair of side partitions and a sole hingedly connected to each cap and surrounding and supporting said cellular structure of said moulding units and locating means on said sole and on said cellular structure cooperating to locate said cellular structure on said sole.

4. A centrifugal separator, comprising a vertically arranged open topped rotatable drum having a perforated side wall, a crown ring mounted on the rim of said drum, a plurality of removable moulding units of cellular structure covering said perforated wall, a plurality of caps detachably suspending said moulding units from said crown ring, a plurality of vertical flexible partitions formed with horizontal ribs whose depth is substantially equal to the spacing of the partitions and a second set of flexible partitions each mounted in contact with a partition of the first set and formed with longitudinal ribs, whose depth is less than the spacing between the partitions, a pair of side partitions and a sole hingedly connected to each cap surrounding and supporting said flexible partitions forming said cellular structure of said moulding units.

5. A centrifugal separator, comprising a vertically arranged open topped rotatable drum having a perforated side wall, a crown ring mounted on the rim of said drum, a plurality of individually removable moulding units of cellular structure covering said perforated wall, and a plurality of caps one for each individual moulding unit detachably suspending said moulding units from said crown ring.

6. A centrifugal separator, comprising a vertically arranged open topped rotatable drum having a perforated side wall, a crown ring mounted on the rim of said drum, a plurality of individually removable moulding units of cellular structure covering said perforated wall, a plurality of caps one for each moulding unit detachably suspending said moulding units from said crown ring and locating means on said crown ring and on each of said caps co-operating to locate said caps on said crown ring.

7. A centrifugal separator, comprising a vertically arranged open topped rotatable drum having a perforated side wall, a crown ring mounted on the rim of said drum, a plurality of individually removable moulding units of cellular structure covering said perforated wall, a plurality of caps one for each moulding unit detachably suspending said moulding units from said crown ring, an annular member resting on the bottom of the drum supporting said removable moulding units and locating means on said annular member and on the bottom of each of said moulding units co-operating to locate said moulding units on said annular member and locating means on said crown ring and on each of said caps co-operating to locate said caps on said crown ring.

8. A centrifugal separator, comprising a vertically arranged open topped rotatable drum having a perforated side wall, a crown ring mounted on the rim of said drum, a plurality of individually removable moulding units of cellular structure covering said perforated wall, a plurality of caps one for each moulding unit detachably suspending said moulding units, which caps are of trapezoidal shape and interlock forming a continuous ring supported by said crown ring and locating means on said crown ring and on each of said caps co-operating to locate said caps on said crown ring.

9. A centrifugal separator comprising a vertically arranged open topped rotatable drum having a perforated side wall, an inwardly projecting crown ring comprising a plurality of alternately arranged trapezoidal and rectangular elements, each with a plurality of slotted recesses and each independently and detachably mounted on the rim of said drum, and a plurality of slotted and ribbed partitions forming a cellular structure covering said perforated side wall detachably mounted by said slots in said slotted recess on said trapezoidal and rectangular elements.

10. A centrifugal separator comprising a vertically arranged open topped rotatable drum having a perforated side wall, an inwardly projecting crown ring mounted on the rim of the drum, a plurality of removable partitions forming a cellular structure covering said perforated wall, each partition being provided with an enlarged head formed with a recess adapted to engage said crown ring by said recess and suspend said partition, and shaped for abutting relationship with one another on said crown ring, and locating means on said crown ring and on said enlarged heads co-operating to locate said enlarged heads on said crown ring.

11. A centrifugal separator according to claim 10 comprising a pin for connecting the heads of the partitions together in groups each of which groups is removable as a unit.

DARIO TEATINI.